(12) United States Patent
Muttathil et al.

(10) Patent No.: US 11,014,744 B2
(45) Date of Patent: May 25, 2021

(54) MATERIAL HANDLING APPARATUS HAVING SAFETY MECHANISM FOR STORAGE LOCATIONS

(71) Applicant: Opex Corporation, Moorestown, NJ (US)

(72) Inventors: George Muttathil, Cherry Hill, NJ (US); Monty McVaugh, Mount Holly, NJ (US); Janice Katz, Cherry Hill, NJ (US); Nate Bloch, Cherry Hill, NJ (US)

(73) Assignee: OPEX Corporation, Moorestown, NJ (US)

( * ) Notice: Subject to any disclaimer, the term of this patent is extended or adjusted under 35 U.S.C. 154(b) by 196 days.

(21) Appl. No.: 16/247,174

(22) Filed: Jan. 14, 2019

(65) Prior Publication Data

US 2019/0218033 A1    Jul. 18, 2019

Related U.S. Application Data

(60) Provisional application No. 62/617,177, filed on Jan. 12, 2018, provisional application No. 62/617,988, filed on Jan. 16, 2018.

(51) Int. Cl.
  *B65G 1/04* (2006.01)
  *B65G 1/02* (2006.01)
  *B65G 1/137* (2006.01)

(52) U.S. Cl.
  CPC ............. *B65G 1/0492* (2013.01); *B65G 1/02* (2013.01); *B65G 1/0485* (2013.01); *B65G 1/1373* (2013.01); *B65G 2207/40* (2013.01)

(58) Field of Classification Search
  CPC .................................................. B65G 2207/40
  See application file for complete search history.

(56) References Cited

U.S. PATENT DOCUMENTS 10,835,929 B1 * 11/2020 Garrett ................... B07C 3/087

FOREIGN PATENT DOCUMENTS

| AT | 410934 | 8/2003 | |
| DE | 3236471 | 4/1984 | |
| DE | 102010000469 | * 8/2011 | ............... B65G 1/02 |
| DE | 202011109061 | 1/2012 | |
| EP | 3251980 | 12/2017 | |
| FR | 2351032 | 12/1977 | |
| FR | 2723574 | 2/1996 | |
| JP | 2010149952 | 7/2010 | |

OTHER PUBLICATIONS

AT 410934 machine translation from espacenet. (Year: 2003).*
FR 2723574 machine translation from espacenet. (Year: 1996).*
International Search Report for PCT/US19/13490 dated May 6, 2019.

* cited by examiner

*Primary Examiner* — Mark C Hageman
(74) *Attorney, Agent, or Firm* — Stephen H. Eland

(57) ABSTRACT

A method and apparatus are provided for delivering items to a plurality of storage locations is provided. The system includes a plurality of storage locations. The storage locations may be positioned to provide an aisle and a delivery mechanism may be operable within the aisle to deliver items to the storage locations. A displaceable safety mechanism may be provided to impede access to the aisle from the storage location.

20 Claims, 14 Drawing Sheets

US 11,014,744 B2

MATERIAL HANDLING APPARATUS HAVING SAFETY MECHANISM FOR STORAGE LOCATIONS

PRIORITY CLAIM

This application claims priority to U.S. Provisional Patent Application No. 62/617,177 filed on Jan. 12, 2018 and U.S. Provisional Patent Application No. 62/617,988. The entire disclosure of each of the foregoing applications is incorporated herein by reference.

FIELD OF THE INVENTION

The present invention relates to material handling systems and, more particularly, to systems that utilize a plurality of storage locations in one or more storage racks. More particularly, the present invention relates to such material handling systems that utilize one or more automated delivery mechanisms for delivering items to the storage locations.

BACKGROUND OF THE INVENTION

The use of automated storage and retrieval has significantly improved the efficiency of material handling. For instance, in the order fulfillment application, automated storage and retrieval systems have significantly reduced the time required to retrieve the items required to fulfill a customer order. A variety of automated storage and retrieval systems are currently known. One exemplary type of system utilizes one or more storage racks, a plurality of vehicles and a track for guiding the vehicles to the storage locations on the racks. The vehicles deliver items to the storage locations where operators remove the items from the storage locations to fulfill orders. When operator removes an item from a storage location, there is the possibility that the operator could reach through the storage location and into the area where the delivery vehicles operate. In such an instance, the operator could be injured if one of the vehicles strikes the operator. Accordingly, it would be desirable to provide a safety mechanism that prevents inadvertent access to the area where the automated delivery mechanism operates. Additionally, it is desirable that such safety mechanism have minimal or no impact on operator efficiency.

SUMMARY OF THE INVENTION

According to one aspect, the present invention provides a material handling apparatus that includes a plurality of sort locations for receiving items. An aisle may be formed between a plurality of the sort locations and a delivery mechanism is operable within the aisle to deliver an item to one of the sort locations. A pivoting door is operable to impede access into the aisle through the sort locations While the methods and apparatus are described herein by way of example for several embodiments and illustrative drawings, those skilled in the art will recognize that the inventive methods and apparatus for sorting items using a dynamically reconfigurable sorting array are not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the methods and apparatus for sorting items using one or more dynamically reconfigurable sorting array defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

BRIEF DESCRIPTION OF THE DRAWINGS

The foregoing summary and the following detailed description of the preferred embodiments of the present invention will be best understood when read in conjunction with the appended drawings, in which the same reference numbers will be used throughout the drawings to refer to the same or like parts.

DETAILED DESCRIPTION OF THE INVENTION

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
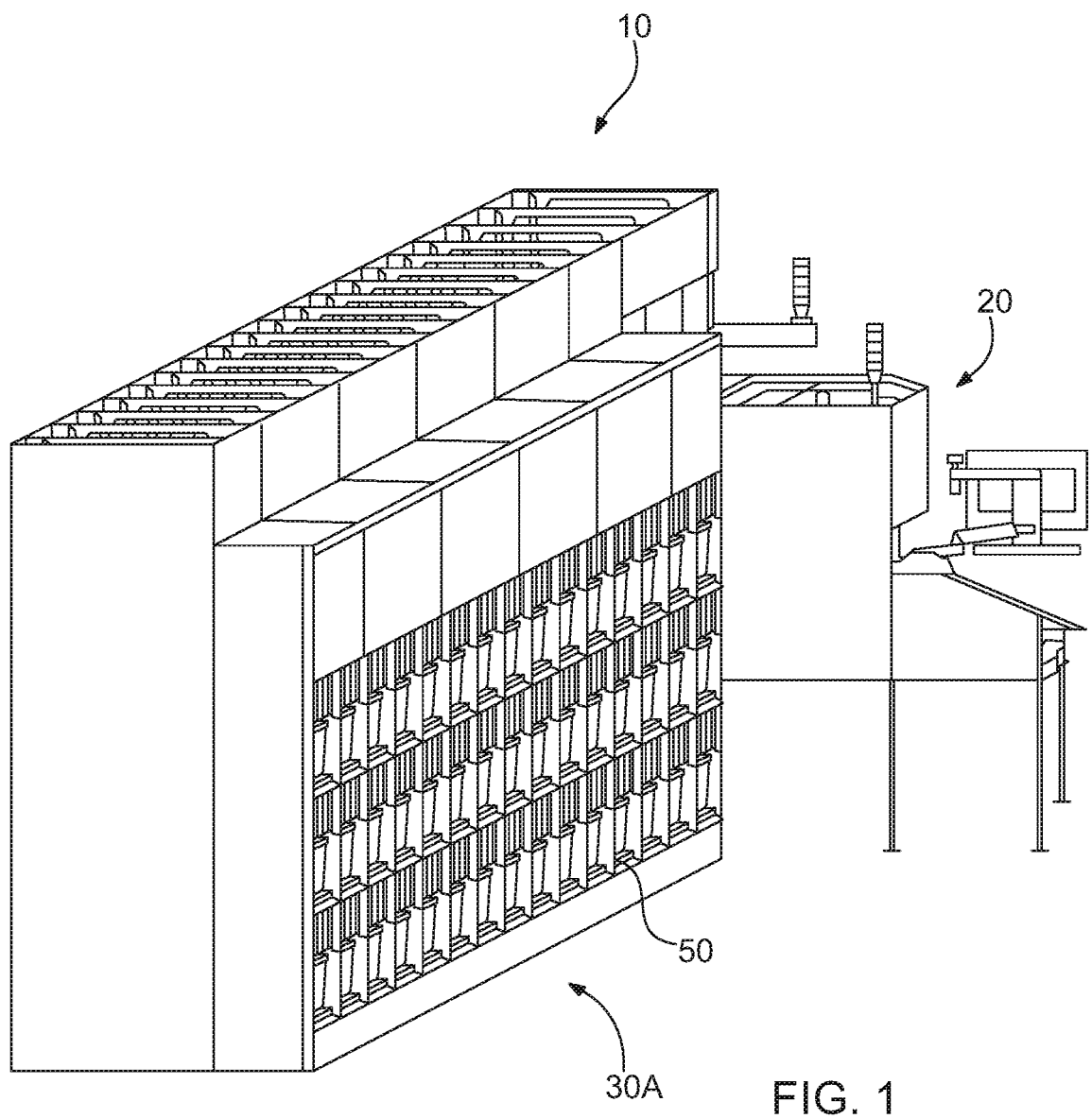
FIG. 1 is a perspective view of a material handling apparatus incorporating aspects of the present invention.
Figure 2:
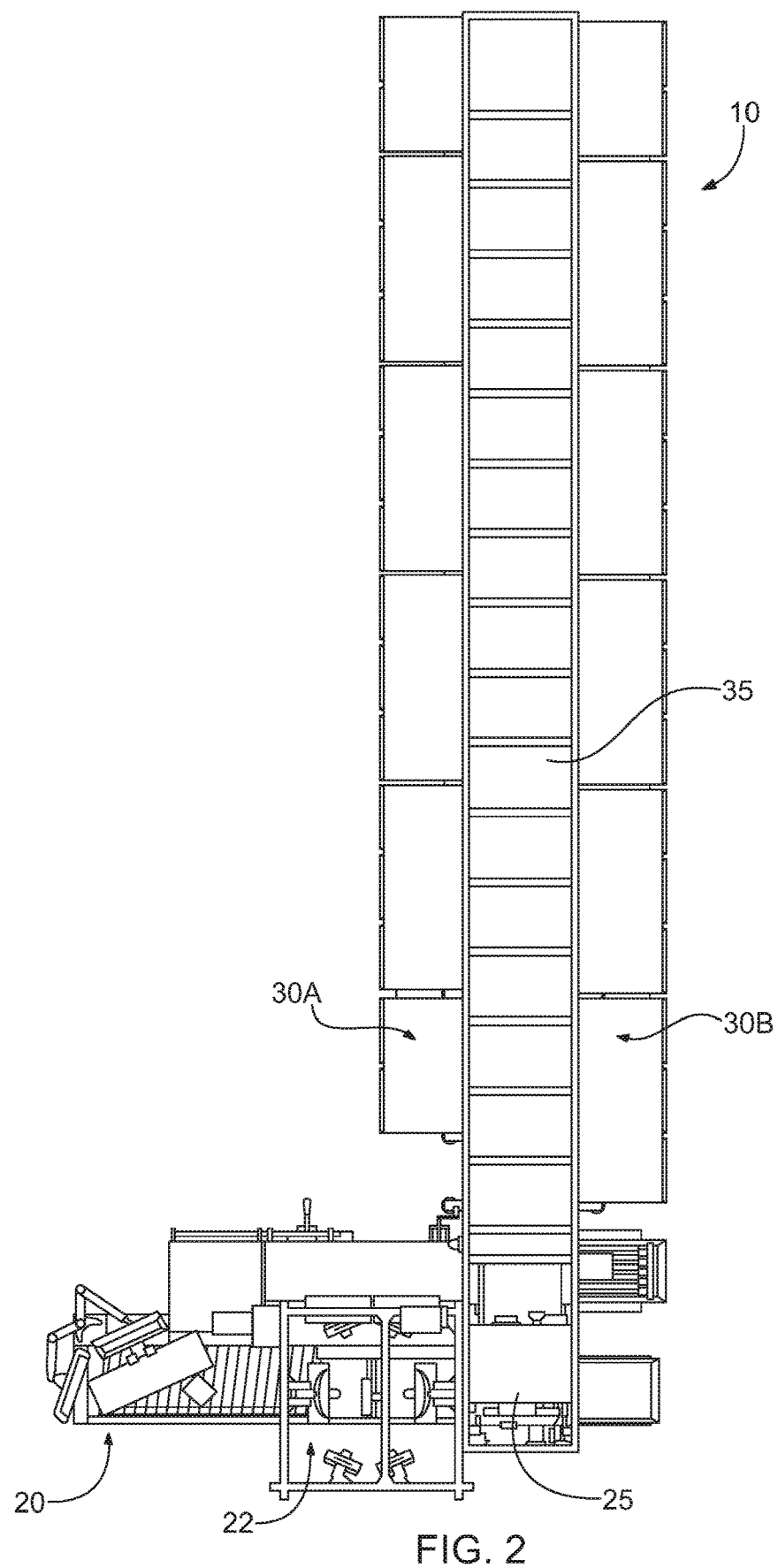
FIG. 2 is a plan view of the material handling system illustrated in FIG. 1.

Referring now to FIGS. 1-5 generally and to FIGS. 1-2 specifically, a material handling apparatus is designated 10. The system 10 may take any number of forms that incorporate a plurality of storage locations. In the present instance, the system includes a pair of spaced apart storage racks 30A, 30B with an aisle 35 formed between the storage racks. A plurality of automated delivery vehicles 120 may operate within the aisle 35. In particular, the delivery vehicles 120 may travel along a track 100 that is positioned in the aisle, as described further below. Additionally, as shown in FIGS. 4-17 and described in greater detail below, the system 10 may include one or more mechanisms to improve the safety of the system.

As noted above, the material handling apparatus may take any of a number of forms that include a number of storage locations. Preferably, the material handling apparatus 10 includes a number of automated vehicles. However, it should be understood that aspects of the present invention are applicable to systems that do not include automated vehicles.

In the exemplary system illustrated in FIGS. 1-2, the material handling apparatus includes a station for feeding items into the system. This station is referred to as the induction station 20. The induction station 20 determines an identifying characteristic for the items to be fed into the system. The identifying characteristic can be any of a variety of characteristics, such as a product number or UPC code. The identifying characteristic can be determined manually, such as by an operator. However, in the present instance, the induction station includes a scanning station 22 that may include a plurality of scanners, such as optical scanners in the form of a bar code scanner, digital camera or otherwise. The induction station may include a conveyor for conveying the items past the scanner or the operator may manually scan the items before they are fed into the system.

The induction station 20 preferably includes a conveyor for serially conveying items to a loading station 25 where the items are loaded onto vehicles 120. A plurality of items may be loaded onto each vehicle. However, in the present instance, each item is loaded onto a separate vehicle and the vehicle then delivers the item to one of the storage locations.

Although the configuration of the induction station may vary, details of an exemplary induction station are provided in U.S. application Ser. No. 15/586,247. The entire description of U.S. application Ser. No 15/586,247 are hereby incorporated herein by reference. Additionally, it should be noted that the induction station is not a necessary element and that aspects of the invention can be utilized in a system that does not include an induction station.

Referring again to FIGS. 1-2 and 5, the details of the storage assembly will be described in greater detail. The system includes a plurality of storage locations 50 for storing items so that the items may be retrieved. In one configuration, the items are delivered to the storage locations by a plurality of automated vehicles 120. Additionally, the system may be configured so that the items can be retrieved from the storage locations by the automated vehicles. Alternatively, the storage locations may be used to accumulate items so that an operator or other automated retrieval device can retrieve the items from the storage location. For instance, a storage bin 40 may be located in each storage location 50 and the system may deliver items to the different storage bins to fulfill customer orders. Once the system has delivered all of the items to a particular storage bin that are required for an order, an operator removes the storage bin 40 from the storage location 50 and replaces the full storage bin with an empty storage bin.

The storage locations may be arranged in any of a variety of orientations. For instance, referring to FIGS. 1-2, the system includes two opposing racks, a front rack 30A and a rear rack 30B. The racks 30A, 30B are spaced apart from one another, forming an aisle 35 between the racks. Optionally, the racks 30A, 30B may be connected by a plurality of cross brackets that interconnect the racks. In particular, a plurality of top cross brackets may extend between the tops of the racks and a plurality of cross braces may extend between the bottoms of the racks thereby connecting the racks and maintain the racks spaced apart to provide the aisle 35.

The storage locations 50 are located on the racks 30A, 30B. The storage locations may be configured in a variety of configurations, such as in a plurality of rows or columns. In the embodiment illustrated in FIGS. 1-3 the storage locations are arranged in a plurality of columns.

As described further below, one or more delivery mechanisms operate within the aisle 35 to deliver items to deliver items to the storage locations in both the front rack 30A and the rear rack 30B. To prevent operator interference and to reduce injury to operators and/or the system, the storage racks include one or more safety mechanisms to impede operator access into the aisle. In particular, each storage location may include a safety mechanism to impede access to the aisle through the storage location.

As described above, the system may include one or more delivery mechanisms that operate within the aisle 35 to deliver items to the storage locations 50. One such exemplary delivery mechanism is an automated delivery vehicle 120 configured to move along a track 100 within the aisle to deliver items to the storage locations 50. The details of exemplary embodiments of delivery vehicles and a track system are described in detail in U.S. application Ser. No. 15/586,247, the entire disclosure of which is hereby incorporated herein by reference.

Figure 3:
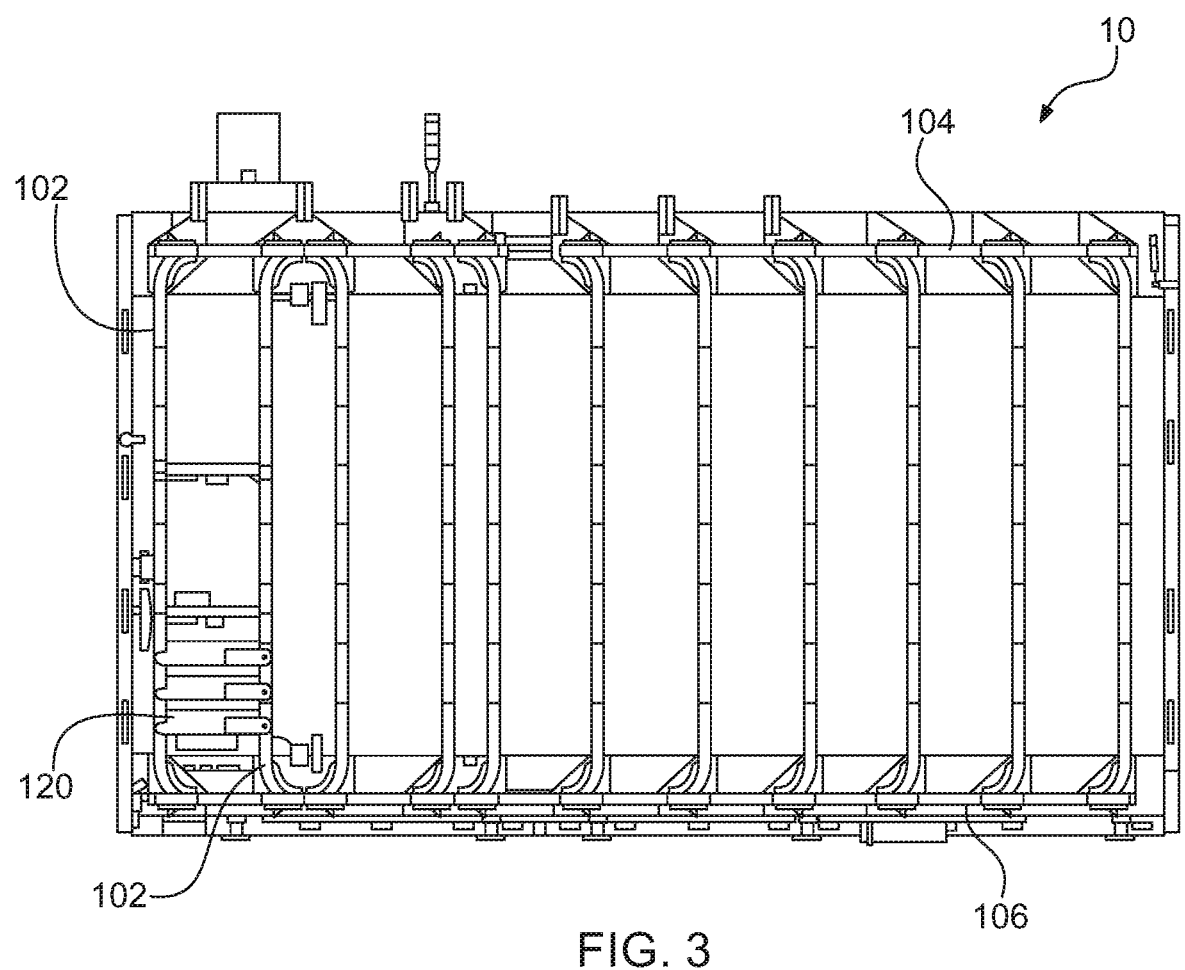
FIG. 3 is schematic side view of a track system of the material handling system illustrated in FIG. 1.
Figure 9:
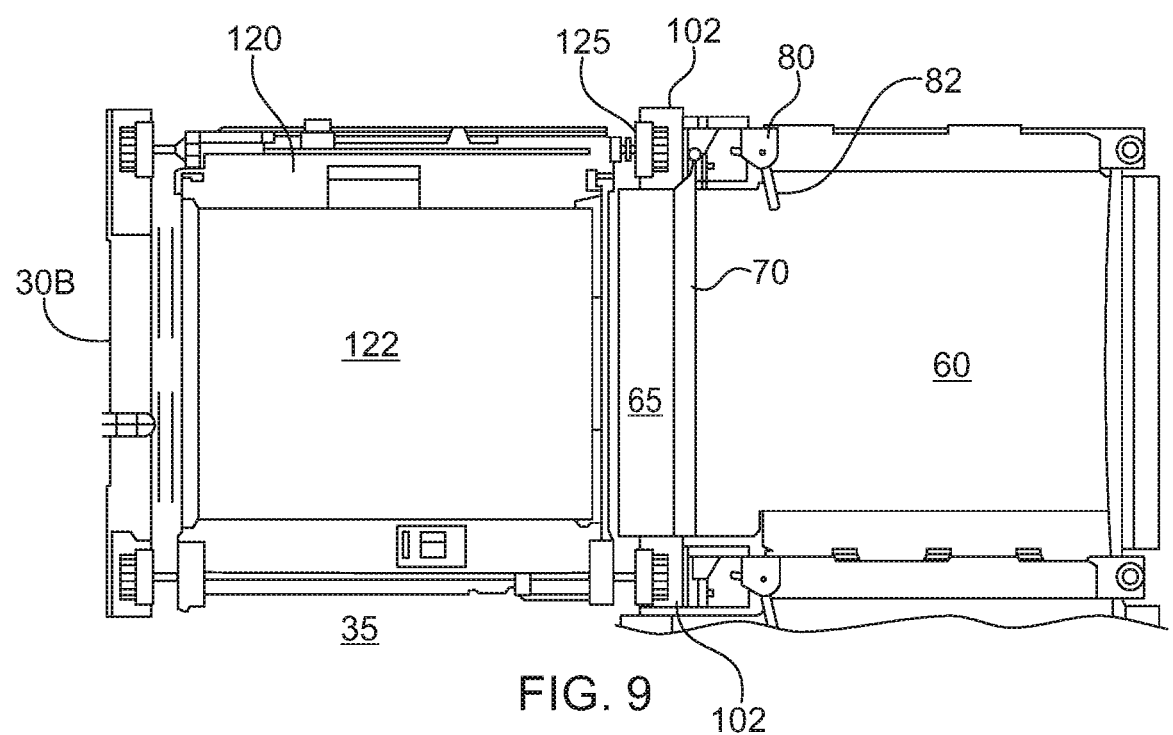
FIG. 9 is a fragmentary plan view of the storage location illustrated in FIG. 7.

Referring to FIGS. 3 and 9, the delivery vehicles 120 include a platform onto which an item may be placed. The platform 122 may be a stationary platform and the system may include elements operable to load items onto the platform and unload items from the platform. Alternatively, the platform may be moveable. For instance, the platform may be one or more horizontal belts. The belts may be selectively operable to convey an item onto the vehicle. Similarly, the belts may be selectively operable to discharge items from the belt. The delivery vehicle may also include a plurality of drive wheels 125 that drive the vehicle along the track 100. In the present instance, the delivery vehicles include two pairs of wheels mounted on two spaced apart axles. In this way, the vehicle includes two front wheels that engage a front track 100A adjacent the front rack 30A and two rear wheels engage a rear track 100B adjacent the rear rack 30B.

The track 100 may include a variety of configurations. In the present instance, the track includes front and rear tracks 100A, 100B positioned on opposing sides of the aisle 35. The vehicles 120 operate in the aisle between the racks 30A, 30B. In this way, the delivery vehicles span the width of the aisle so that the vehicles can deliver items to storage locations in the front rack 30A or to storage locations in the rear rack 30B. The rear track 100B is configured substantially similarly to the front track 100A so that the two tracks form opposing tracks that cooperate with the delivery vehicles to guide the delivery vehicles. Accordingly, in the following discussion, it should be understood that the described details of the track apply to both the front track 100A and the rear track 100B.

In particular, in the present instance, the storage racks 30A, 30B are configured so that the storage locations are arranged in a plurality of columns. Accordingly, the track 100 comprises an upper rail 104 and a lower rail that are interconnected by a plurality of vertical tracks 102. During operation, a vehicle departs the loading station 25 with an item and travel up a vertical track to the upper rail 104. The vehicle 120 travels along the upper rail 104 until reaching the appropriate column. The vehicle then travels down the column to the appropriate storage location 132. The vehicle then travels down to the column to the lower rail 106. The vehicle travels along the lower rail to return to the loading station to receive another item. In this way, the vehicles loop around the track 100 to deliver items to storage locations. As the vehicles travel along the track, the vehicles move through the aisle 35.

Figure 4:
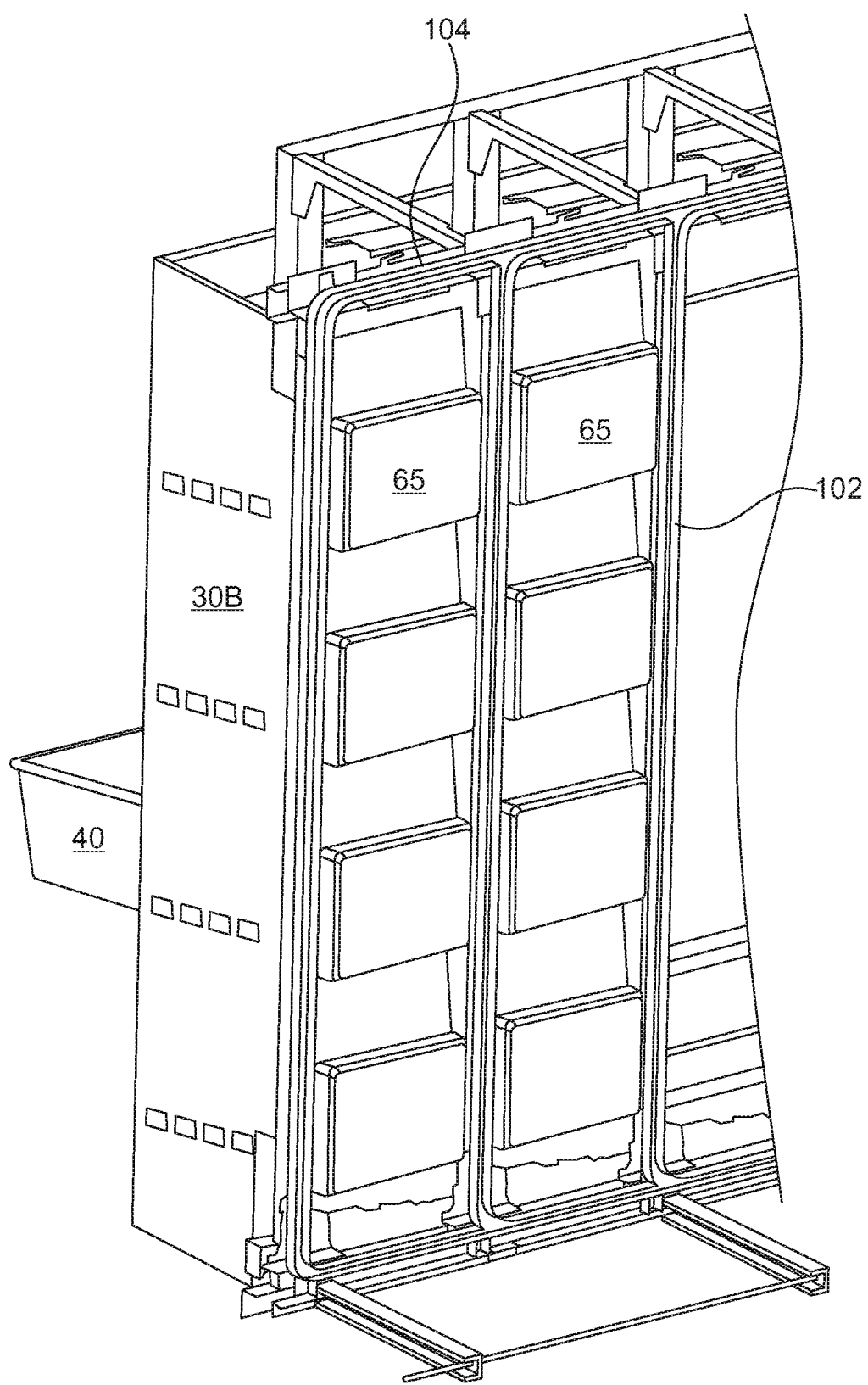
FIG. 4 is an enlarged fragmentary view of a portion of the material handling apparatus illustrated in FIG. 1.
Figure 5:
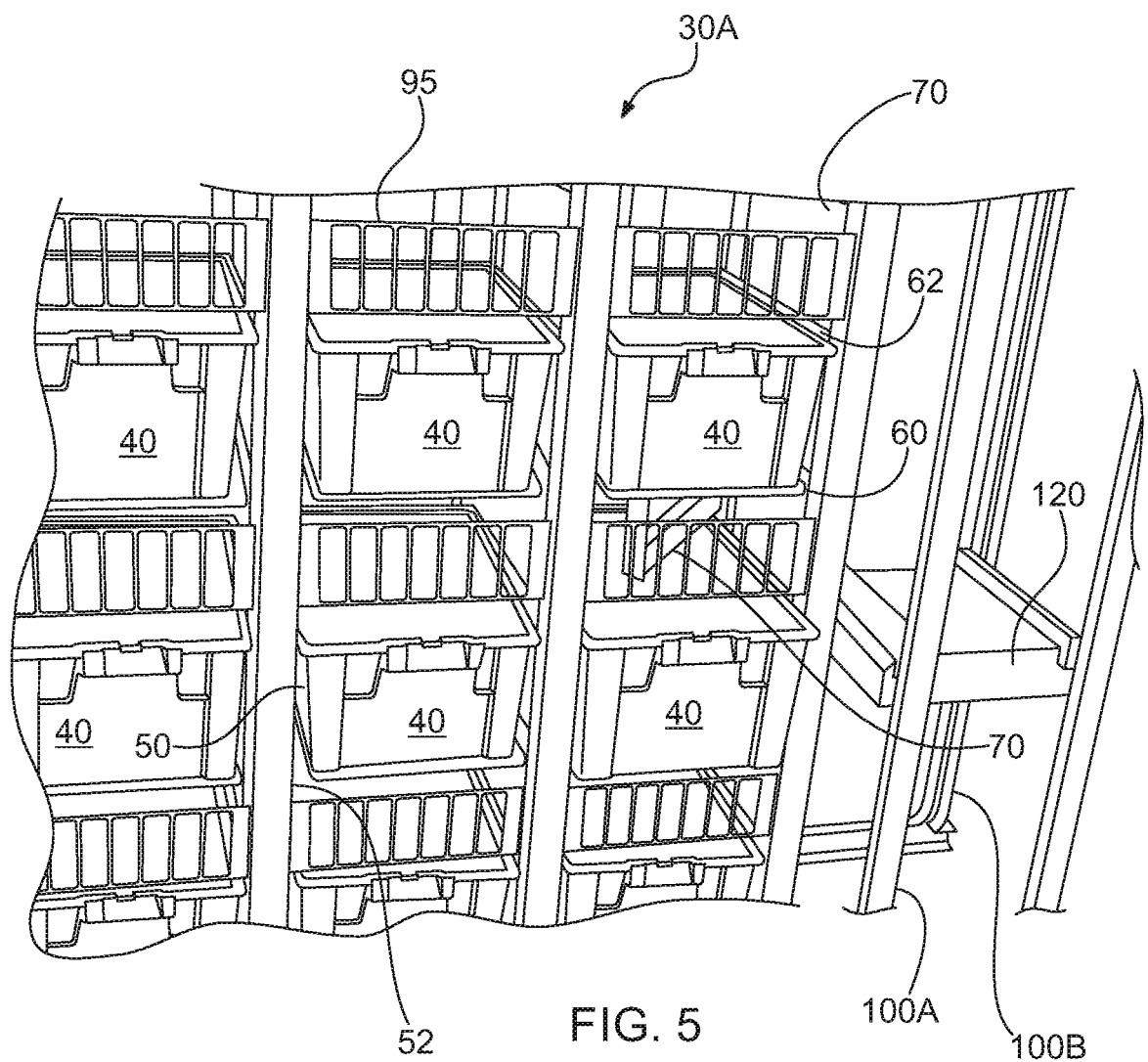
FIG. 5 is an enlarged fragmentary perspective view of the portion of a storage rack of the apparatus illustrated in FIG. 1.

Referring now to FIGS. 4-12 details of the storage locations will be described in greater detail. As shown in FIG. 5, each storage location 50 includes a shelf 60 that forms a support platform. The shelf 60 may receive items from the delivery vehicles 120. However, in the present embodiment, the system includes a storage bin 40 at each storage location 50. The shelf 60 supports the storage bin 40 at the storage location. The shelf 60 may also include side walls 62 that extend upwardly to enclose the sides of the storage location. The sidewalls may extend up the entire height of the storage location, however in the present instance the side walls 62 extend up a height approximately equal to the height of the storage bin. Additionally, the shelf 60 may include a back wall 65 that forms a wall between the storage location and the aisle 35. The back wall 65 forms a stop impeding the storage bin from being pushed into the aisle 35.

The storage locations and the storage bins are configured so that the vehicles discharge items directly into the storage bins in the storage locations. Each storage location has a height 52 that extends from the top surface of the shelf 60 to the bottom surface of the shelf that is above the storage location. In this way, the upper shelf forms the upper edge of the storage location. As shown in FIG. 5, the storage bins 40 have a height that is less than the height of the storage location.

Referring to FIG. 4, the storage rack 30B is shown broken away from the front rack 30A so that the storage rack can be seen from the aisle side. As can be seen, a gap is formed between two adjacent back walls 65. The gap defines the maximum theoretical height of the feed slot available for feeding items into a storage location. Similarly, the clearance gap can be seen in FIG. 7 and the height of the clearance gap is designated 54. If the storage bin is taller than the back wall 65 then the clearance gap is measured as the distance between the upper lip 42 of the storage bin 40 and the shelf above the storage bin. If the back wall is taller than the storage bin 40 then the clearance gap 54 is measured as the distance between the top edge of the back wall 65 and the shelf above the storage location.

Theoretically, the operator can reach through the clearance gap 54 and accidentally reach into the aisle 35. Since the delivery vehicles move rapidly through the aisle, reaching into the aisle could lead to operator injury. To prevent such injury, the system 10 may include a safety gate 70 that spans the area of the clearance gap 54 at the back edge of the storage location 50. In particular, as shown in FIG. 4, each storage location includes a safety gate 70 that closes the clearance gap 54 that extends above each back wall 65. As discussed further below, the safety gate for a storage location remains closed unless a storage bin is loaded into the storage location.

Figure 6:
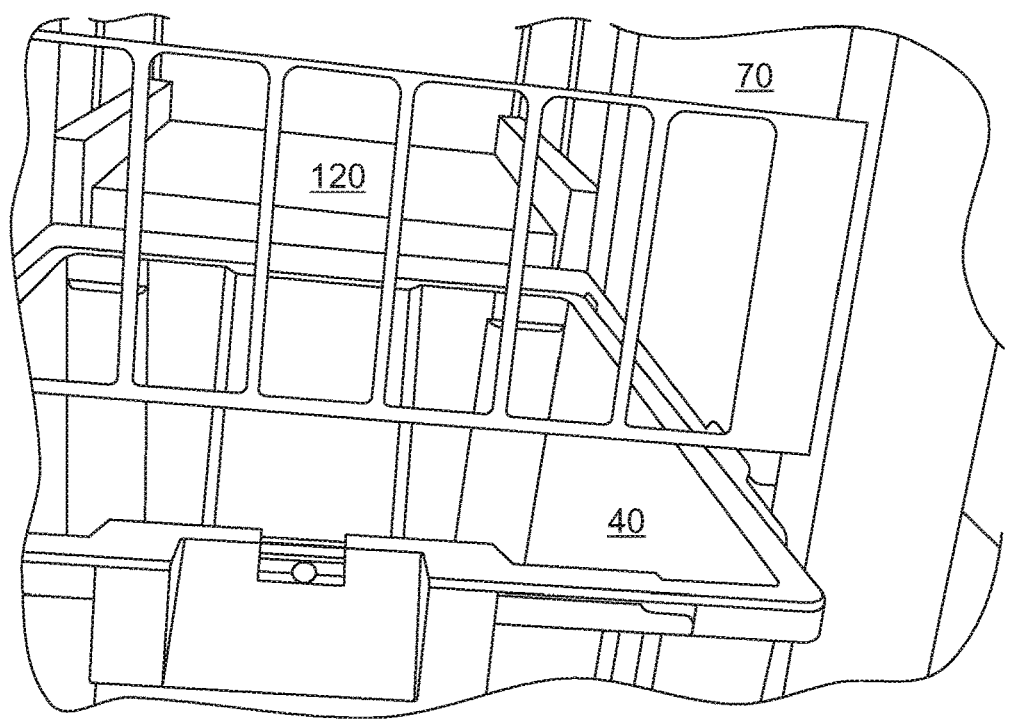
FIG. 6 is a perspective view of a storage location of the storage rack illustrated in FIG. 5, illustrating a safety gate shown in an open position.

Referring to FIG. 6, a storage location 40 is illustrated with the safety gate 70 shown in the open position. The safety gate is a generally planar pivoting gate that has a height similar to the height of the clearance space 54. In the open position illustrated in FIG. 6 the safety gate is disposed adjacent the side of the storage location to provide access so that the delivery mechanism 120 can discharged an item through the feed slot and into the storage bin 40.

Figure 7:
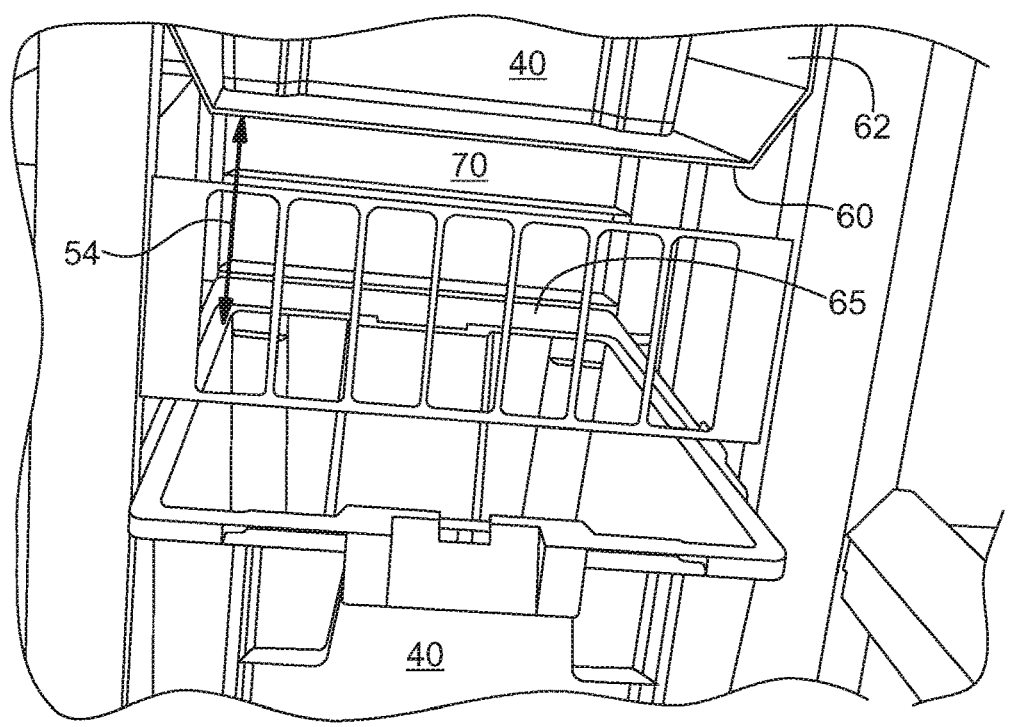
FIG. 7 is a perspective view of the storage location illustrated in FIG. 6, illustrating the safety gate in a closed position.
Figure 10:
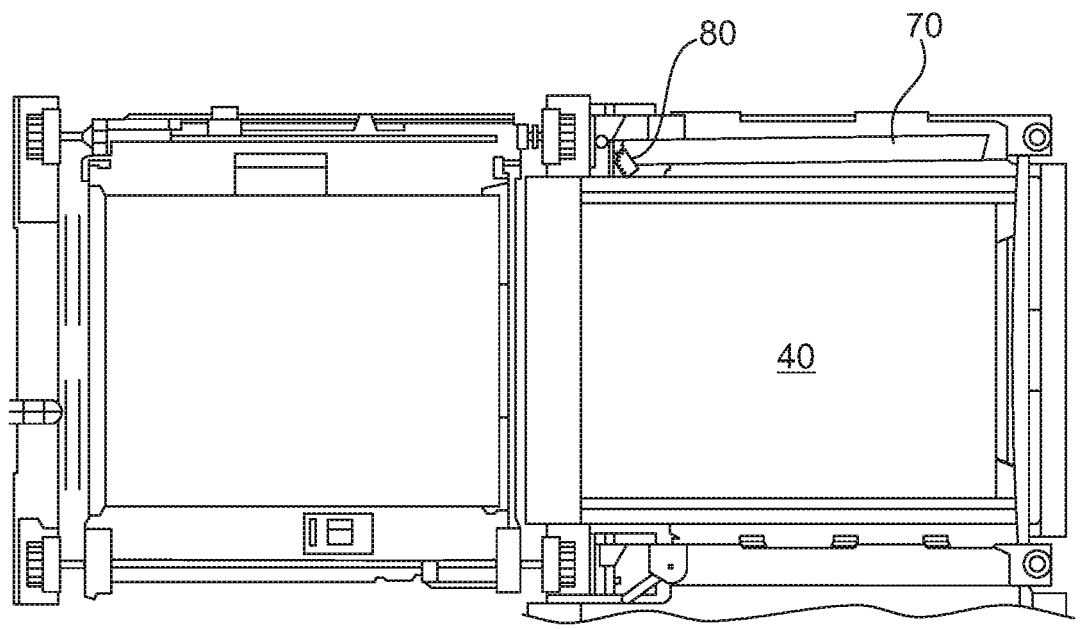
FIG. 10 is a fragmentary plan view of the storage location illustrated in FIG. 6.

As shown in FIGS. 9 and 10, the safety gate 70 is pivotable between an open position and a closed position. The open position is illustrated in FIG. 6 and the closed position in illustrated in FIG. 7. As can be seen in FIG. 7, in the closed position the safety gate is parallel to the back side of the storage location. In this way, the safety gate covers the feed slot 54 so that items cannot pass between the storage location and the aisle. The safety gate has two effects. First, an operator cannot inadvertently reach through the storage location and into the aisle. Secondly, the delivery mechanisms cannot deliver an item to the storage location when the safety gate is closed. As described further below, the safety gate is opened by loading a storage bin into the storage location. Therefore, the safety gate also has the effect of preventing items from being delivered to a storage location that does not have a storage bin.

The safety gate 70 may be operated by any of a variety of mechanisms. For instance, a solenoid or other drive element may drive the safety gate between the open position and the closed position. The solenoid may operate in response to a sensor that detects the presence of a storage bin in the storage location or a switch may be positioned in the storage location whereby the storage bin actuates the switch when the storage bin is loaded into the storage location. In the present instance, a biasing element biases the gate toward the closed position and a manual actuator is operable to drive the gate into the open position. In particular, the actuator 80 is configured to cooperate with the bins so that the act of loading a bin into the storage location actuates the actuator 80.

Figure 8:
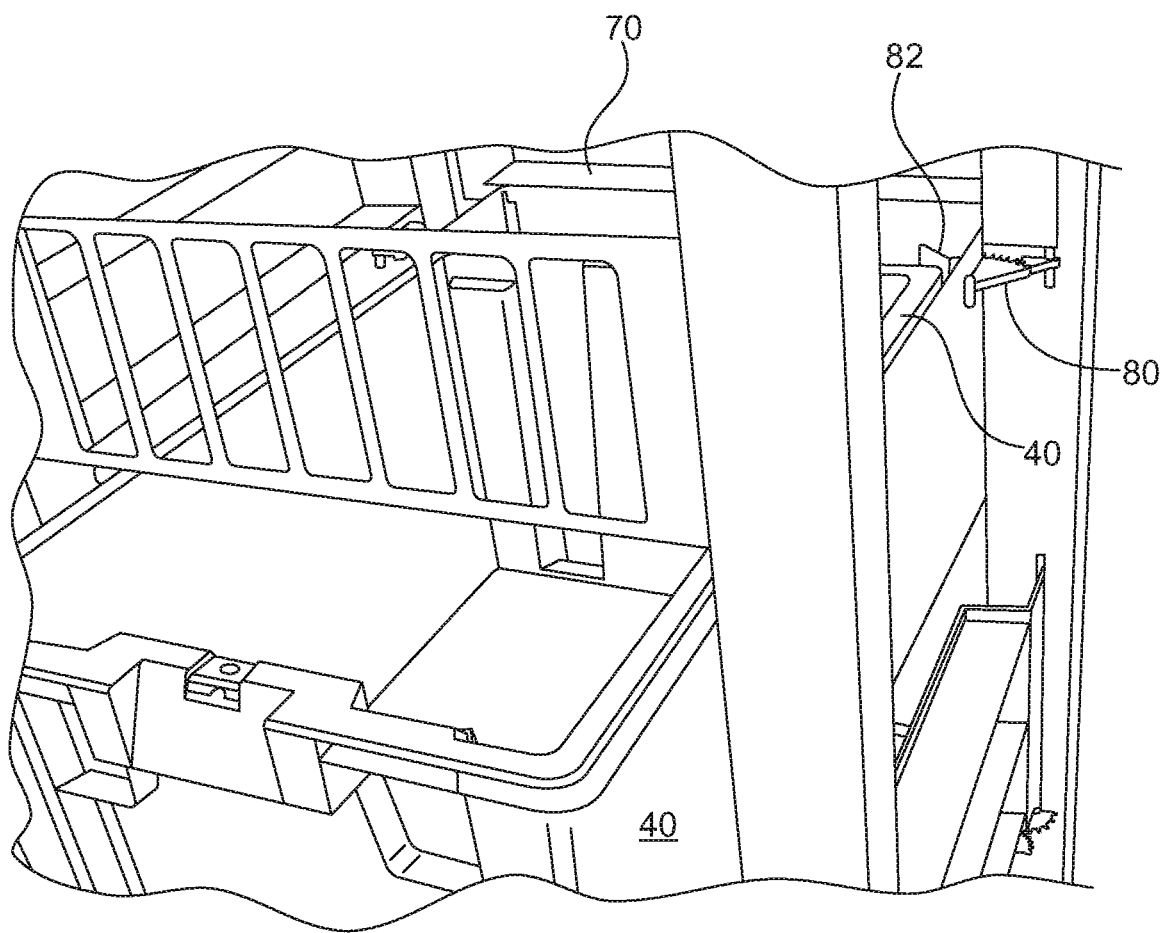
FIG. 8 is an alternate enlarged perspective view of the storage location illustrated in FIG. 7, illustrating an actuator for the safety gate.
Figure 11:
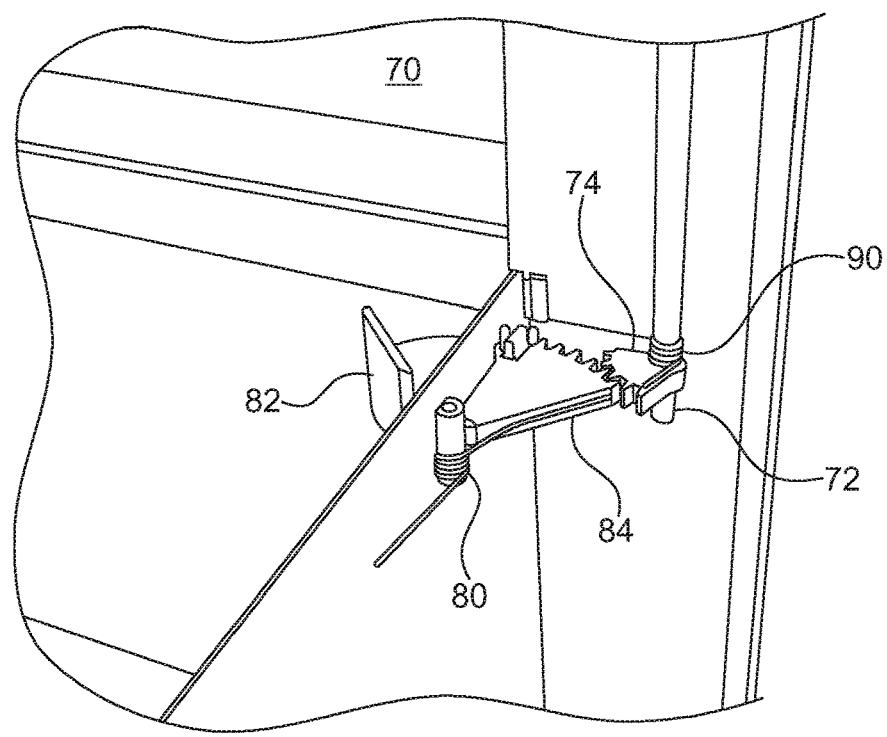
FIG. 11 is an enlarged fragmentary perspective view of an actuator for the safety gate illustrated in FIG. 6, illustrating the gate in a closed position.
Figure 12:
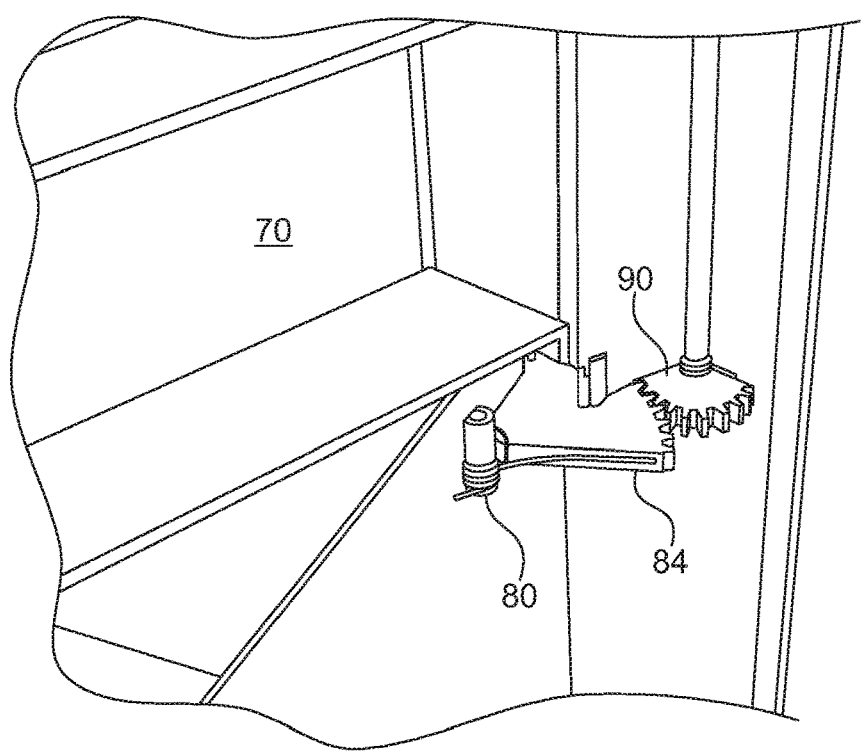
FIG. 12 is an enlarged fragmentary perspective view of the actuator illustrated in FIG. 11, illustrating the gate in a partially open position.

Referring to FIGS. 11-12, the actuator 80 comprises an actuation pad 82 and a drive element 84. In the present instance, the safety gate 70 is pivotable about a pivot axis 72 and the actuator 80 is pivotable about an axis parallel to the pivot axis 72 of the gate. The drive element 84 comprises a plurality of gear segment that meshes with a gear segment connected to the pivot axis of the gate. In this way, pressing against the actuation pad 82 rotates the drive element 84, which in turn rotates the drive element attached to the safety gate, thereby pivoting the gate toward the open position. As shown in FIG. 8, the actuator 80 is positioned in the storage location at a height corresponding to the top lip of the bin 40. In this way, when the bin is loaded into the storage location the bin 40 engages the actuation pad 82 when the leading edge of the bin is near the rear of the storage location. As the operator continues to push the bin toward the back of the storage location the bin displaces the actuation pad until the actuation pad is pressed against the side wall 62. The displacement of the actuation tab actuates the actuator 80 causing the safety gate to open.

When the storage bin 40 is loaded in the storage location 50 the height of the bin limits access into the storage location. However, it may be possible to reach through the clearance space, through the open feed slot and into the aisle. Accordingly, it may be desirable to include a fixed cover or guard that encloses a portion of the clearance gap 54 at the front of the storage location. For instance, as shown in FIG. 5 a guard may be mounted at the front end of each storage location, extending across the width of the storage location and extending upwardly to cover a majority of the clearance gap at the front of the storage location. In this way, the front guard 95 impedes reaching into the storage location over the storage bin.

As described above, the system includes a plurality of displaceable gates or doors that selectively close the back end of each storage location to impede access to the aisle 35 from within the storage location. Referring to FIGS. 13-21 an alternate safety mechanism is illustrated. This alternate safety mechanism is configured to cover the front opening of the storage location to impede access into the storage location when a bin is not loaded in the storage location. The safety mechanism illustrated in FIGS. 13-21 is designed to be an alternate mechanism to the safety gate 70 described above.

Figure 13:
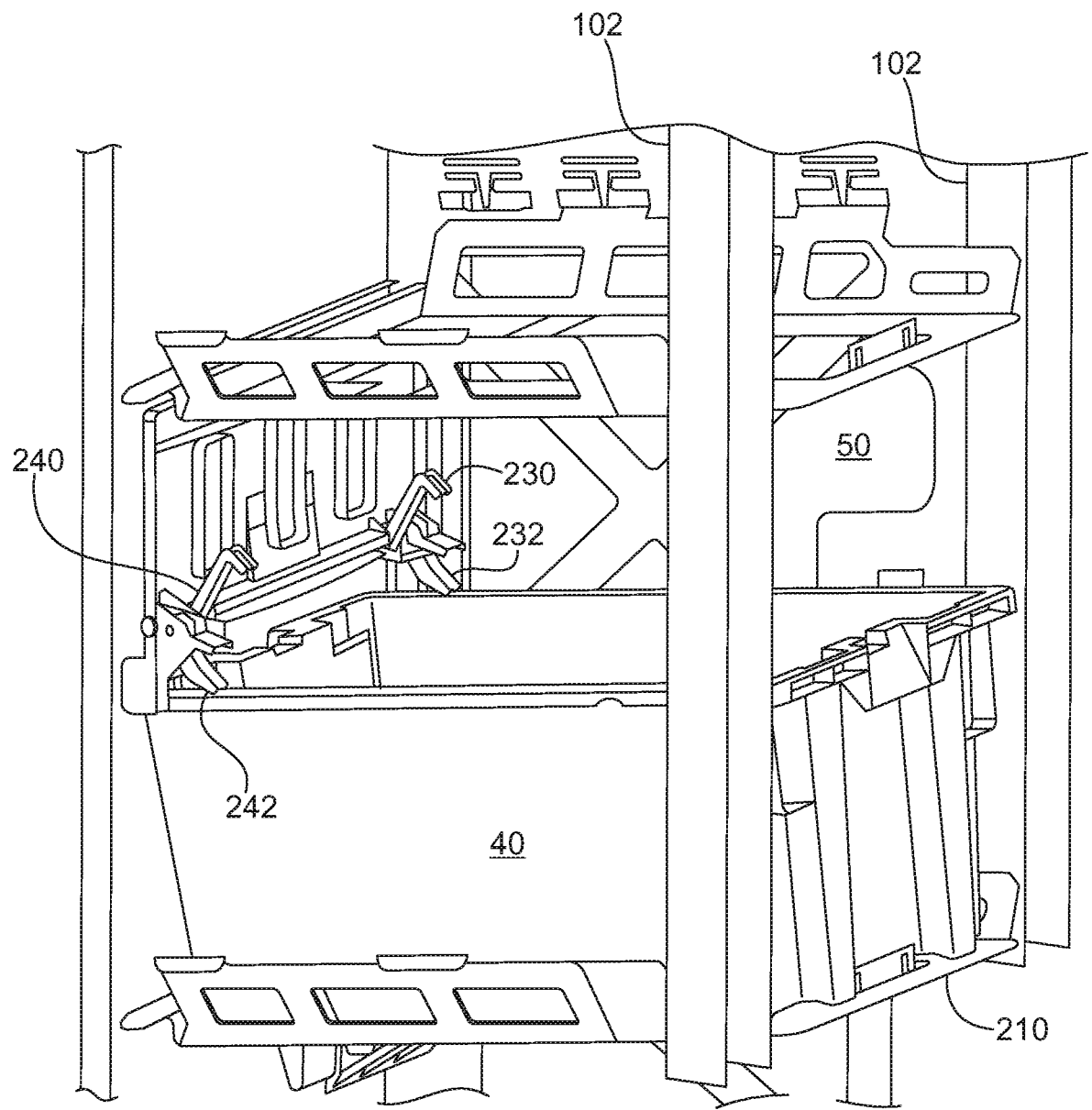
FIG. 13 is an enlarged fragmentary rear perspective view of a storage location of the material handling apparatus illustrated in FIG. 1, illustrating an alternate embodiment of a safety mechanism.

Referring to FIG. 13, a storage location 50 is illustrated. The storage location is similar to the storage locations described above, however, the shelf 210 is configured differently than the shelf 60 described above. Additionally, the storage location does not include a back wall 65.

Figure 14:
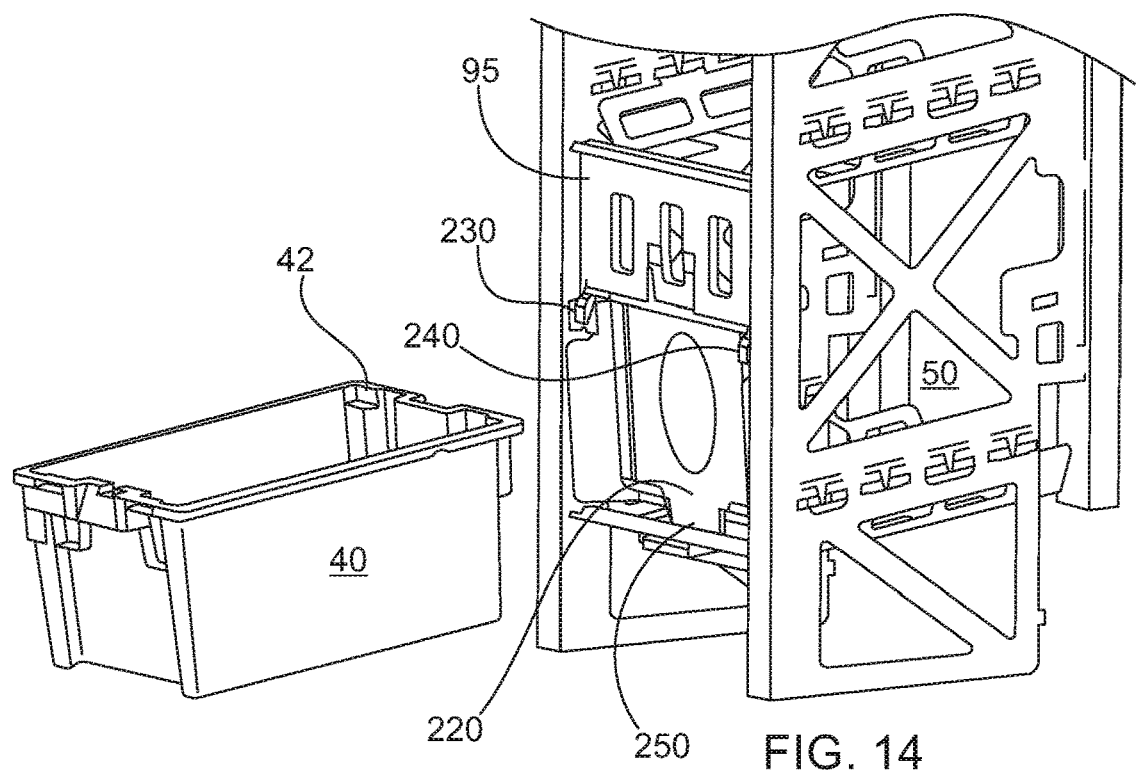
FIG. 14 is a fragmentary front perspective view of the storage location illustrated in FIG. 13, with the safety mechanism in the closed position.
Figure 15:
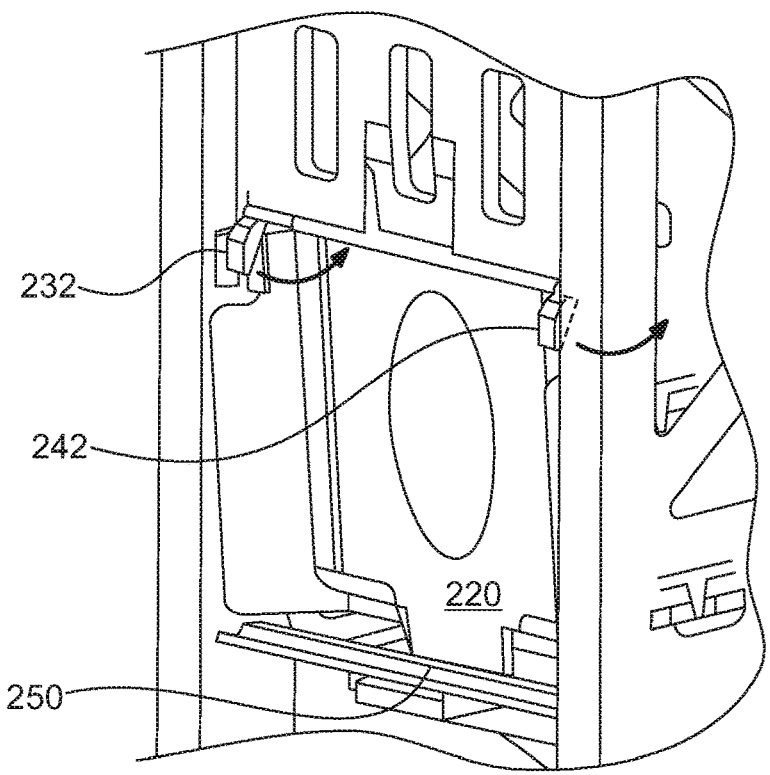
FIG. 15 is an enlarged fragmentary front perspective view of the storage location illustrated in FIG. 14.

As shown in FIGS. 14-15, a pivoting door 220 blocks access to the storage location 50. The safety door 220 pivots about a horizontal axis. More specifically, the door pivot between a closed position in which the door is generally vertical and an open position in which the door is generally horizontal. More specifically, in the open position the door pivots inwardly into the storage location and nests into a recess in the shelf so that the bin 40 rests on the door.

Figure 16:
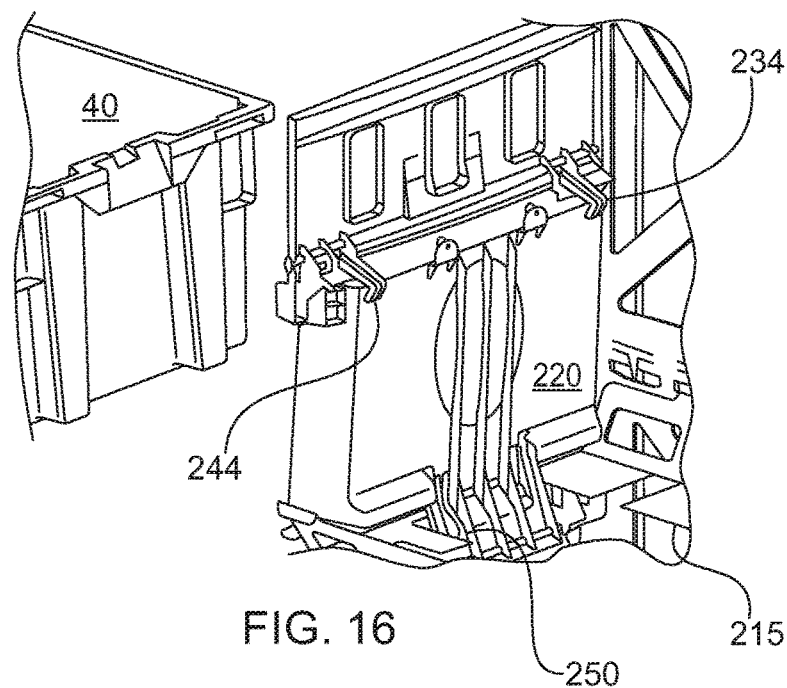
FIG. 16 is a fragmentary rear perspective view of the storage location illustrated in FIG. 14.
Figure 17:
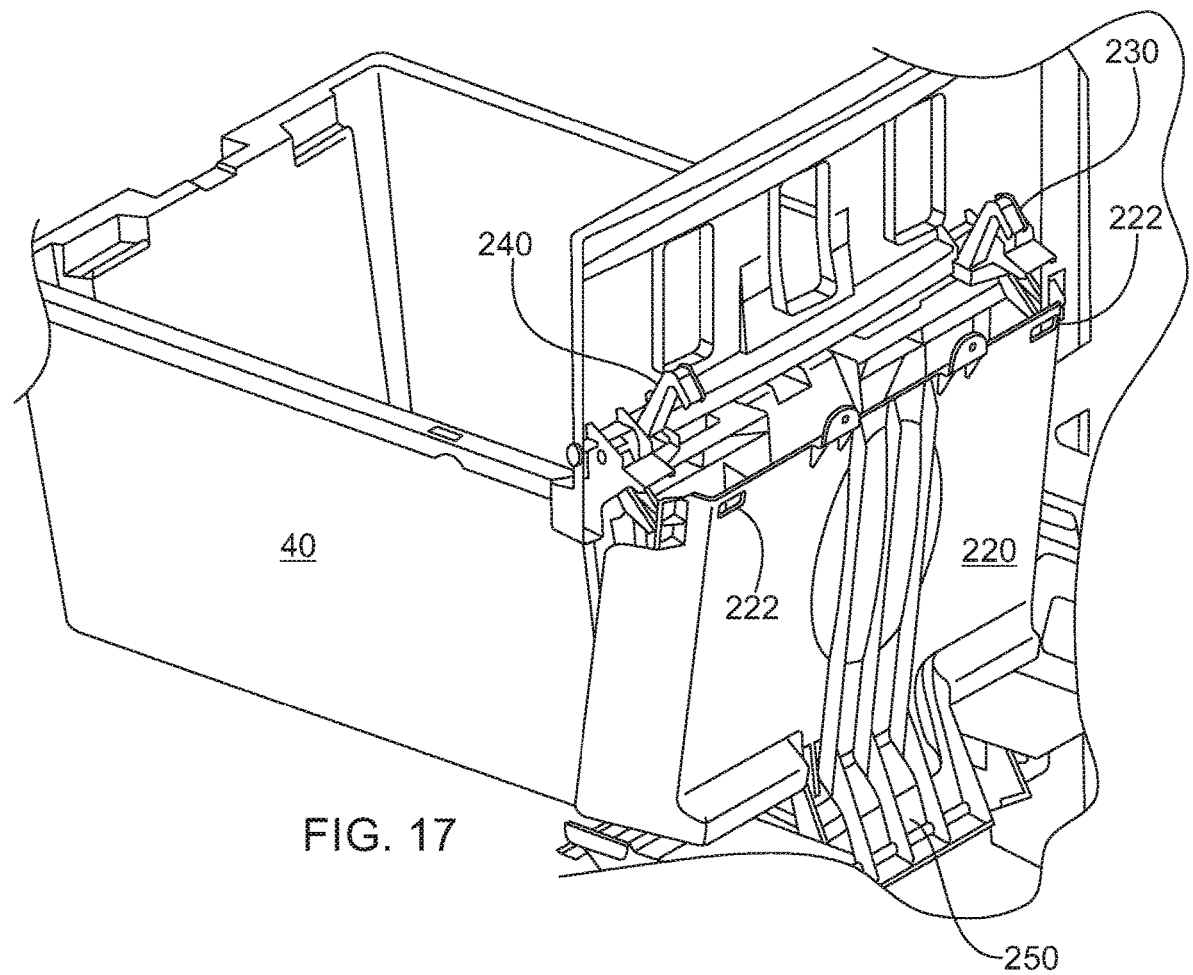
FIG. 17 is a fragmentary rear perspective view of the storage location illustrated in FIG. 16, illustrating the safety mechanism in the unlatched position.

One or more safety locks releasably lock the door 220 in the closed position. The safety locks impede access to the storage location to ensure that an operator does not inadvertently push open the door 220. For example, as shown in FIG. 16, the system may include first and second safety locks 230, 240 that lock the door closed. The first safety lock 230 comprises a latch 234, such as a latching finger, that engages an upper portion of the door. Similarly, the second safety lock 240 may include a latch 244 that engages an upper portion of the door. For instance, the door may be formed to include a feature, such as a ledge, recess or aperture that cooperates with the safety locks 230, 240 to prevent the door from opening. For example, as shown in FIG. 16, the door may include a pair of apertures 222 and the latches 234, 244 of the first and second safety locks 230, 240 engage the apertures to impede the door pivoting into the open position. The safety locks 230, 240 also includes actuators for releasing the safety locks. For example, each safety lock may include an angled actuation surface 232, 242. The safety locks 230, 240 are configured so the operating the actuators displaces the latch 234, 244 into the unlocked position. For example, each safety lock 230, 240 may be pivotable about a pivot axis so that operating the actuators 232, 242 pivots the latches 234, 244 away from the upper locking apertures 222 to unlock the first and second safety locks 230, 240.

The safety locks 230, 240 may be configured so that the locks may be sequentially unlocked. However, in the present instance, the locks are configured so that simultaneous operation of the safety locks 230, 240 is required to unlock the door 220. In particular, each safety lock 230, 240 includes a biasing element that biases the latch 234, 244 toward the locked position. Therefore, upon release of the actuators 232, 242, the biasing elements urge the latches toward the locked position. Accordingly, to move the door toward the opened position, both actuators 232, 242 must be actuated simultaneously. In the present instance, the actuators 232, 242 are actuated by pressing the actuators inwardly toward the storage location.

In addition to the first and second safety locks 230, 240 at the upper edge of the door 220, the system may also include a third safety lock 250 spaced apart from the first two safety locks. As shown in FIG. 15, the third safety lock may be positioned adjacent the lower edge of the door.

Figure 18:
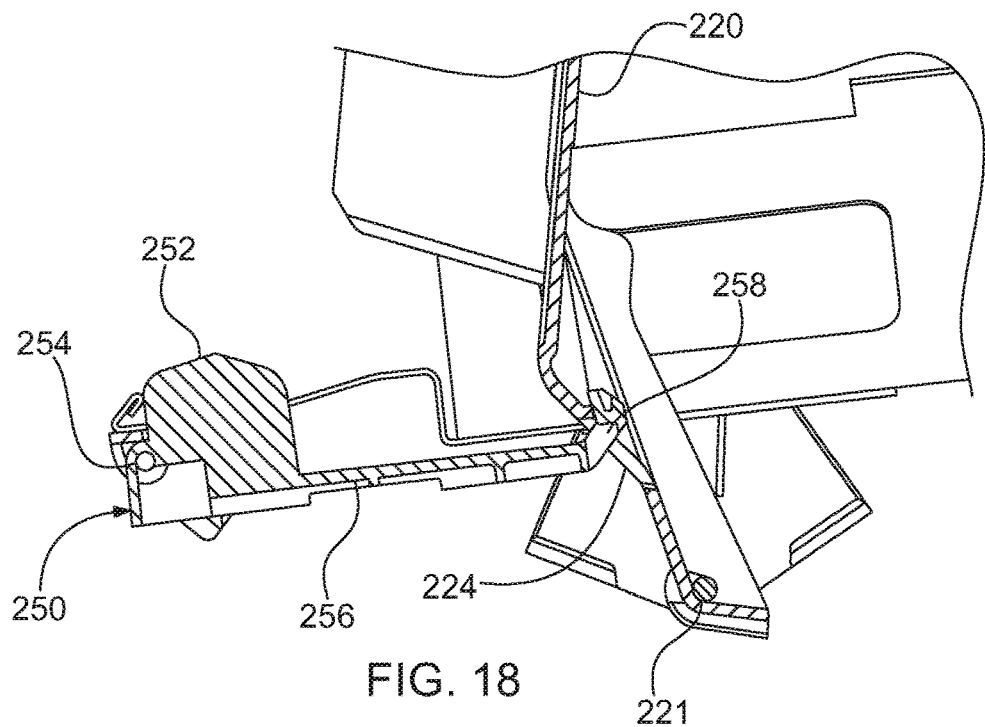
FIG. 18 is an enlarged fragmentary sectional view of a safety mechanism of the material handling apparatus illustrated in FIG. 13.

Referring to FIGS. 18-21 the details of the third safety lock are illustrated. FIG. 18 illustrates the third safety lock 250 in a locked position. The safety lock includes an elongated arm 256 that pivots about a pivot axis 254. An actuation surface 252, such as a button is formed at a first end of the arm, adjacent the pivot axis. A latching finger 258 is formed at a second end of the arm 256, remote from the button 252. The latch 258 extends through a lower aperture 224 in the door so that the latch engages the inside upper edge of the aperture to prevent the door from pivoting into the opened position.

Figure 19:
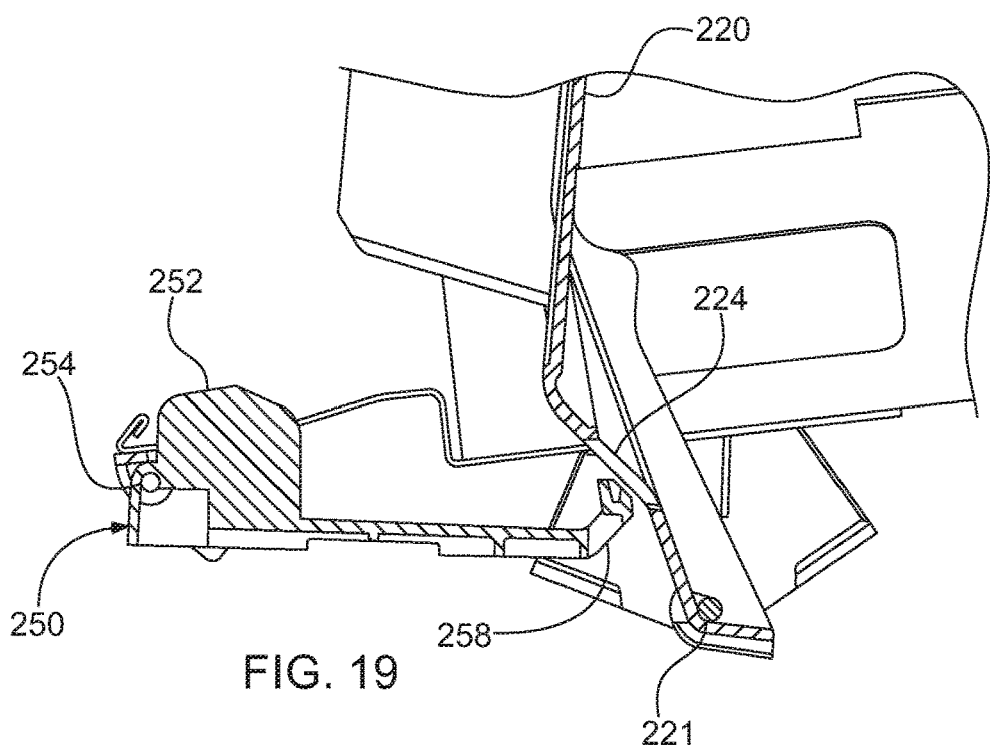
FIG. 19 is an enlarged fragmentary sectional view of the safety mechanism illustrated in FIG. 18 shown in the unlatched position.

FIG. 19 illustrates the third safety lock 250 in an unlatched position. For instance, the lock is unlocked by pressing down on button 252, thereby pivoting the elongated arm downwardly. In FIG. 19, the third safety lock is unlocked, but the door 220 remains in the closed position.

Figure 20:
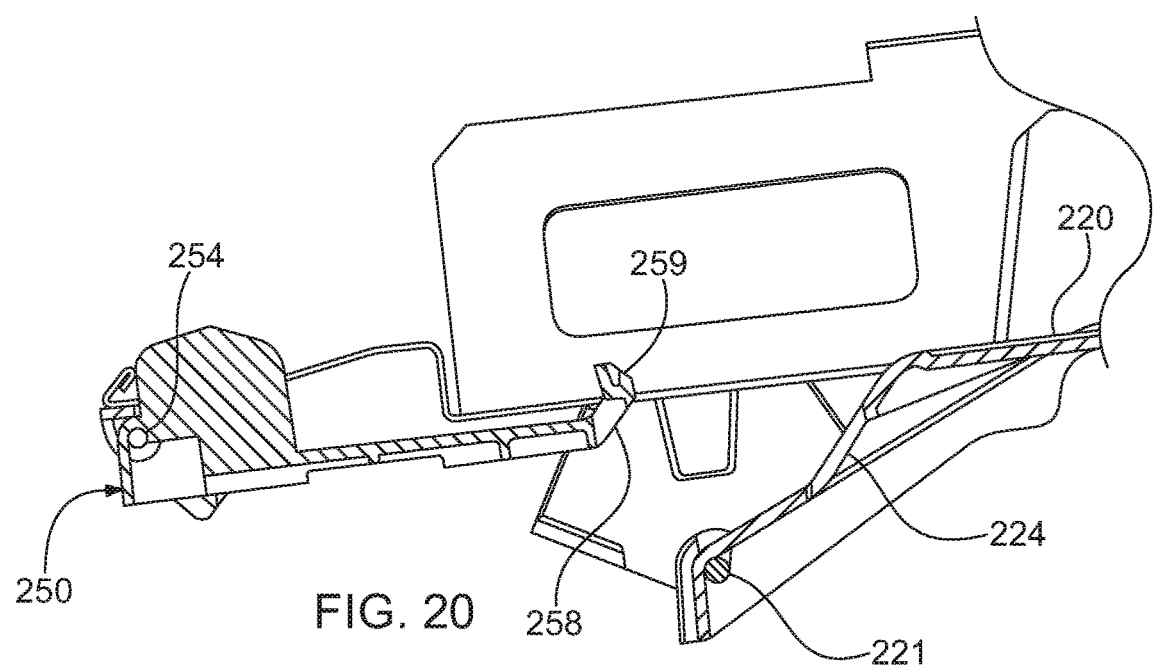
FIG. 20 is an enlarged fragmentary sectional view of the safety mechanism illustrated in FIG. 18 with the safety door in the open position.
Figure 21:
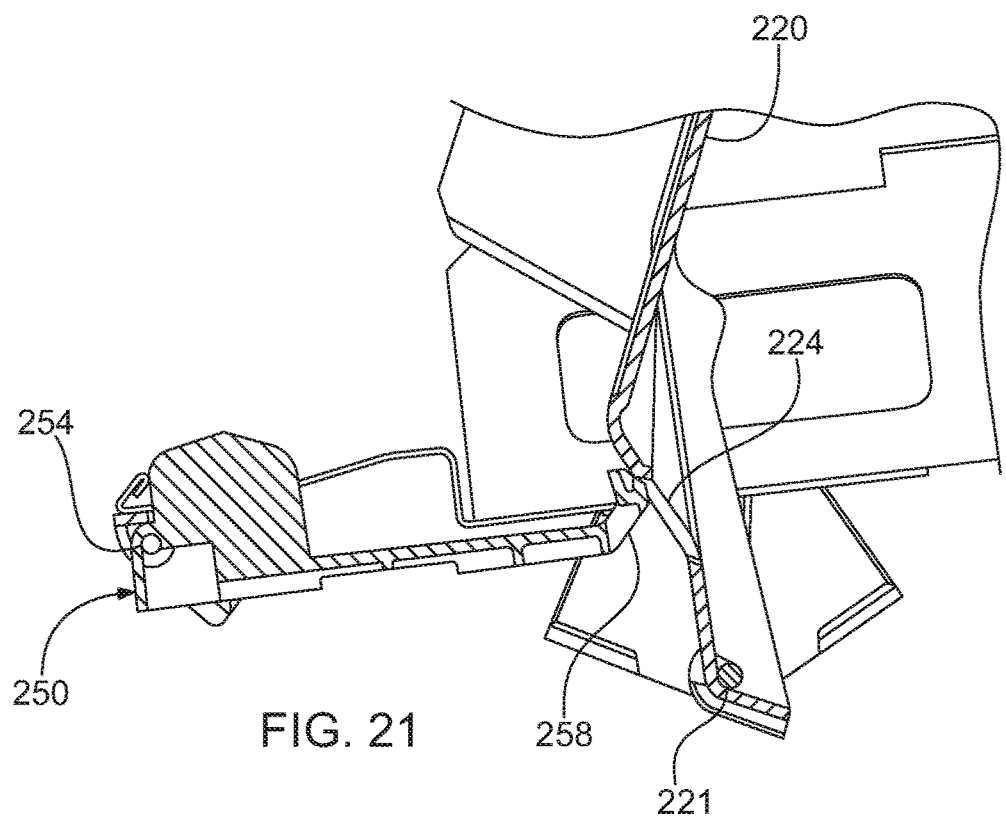
FIG. 21 is an enlarged fragmentary sectional view of the safety mechanism illustrated in FIG. 18 with the safety door in a partially closed position.

FIG. 20 illustrates the door 220 in an open position. Specifically, the door 220 pivots inwardly into the storage location so that the door is generally horizontal, providing access into the storage location. More specifically, in the present instance, the shelf 210 includes a recess 215 configured to receive the door 220. In this way, when the door pivots from the closed position to the open position the door pivots into the recess 215 so that the storage bin 40 can be inserted into the storage location. In particular, the door 220 lies under the storage bin 40 when the bin is positioned in the storage location. As noted previously, a biasing element biases the door 220 toward the closed position. For instance, a torsion spring may bias the door about the pivot axis 221 to urge the door toward the closed position. In the present instance, the bin 40 is sufficiently heavy to hold the door in the open position again the biasing force that urges the door toward the closed position.

The third safety lock 250 may also include an element biasing the lock toward the locked position. For example, the lock may include a spring, such as a torsion spring biasing the arm 256 about the pivot axis 254. Pressing actuator button 252 operates to pivot the arm 256 about the axis 254 against the bias of the biasing element. In this way, the safety locks are each pivotable between first and second positions. Additionally, biasing elements bias the locks from the second position back to the first position.

As can be seen in FIG. 20, once actuation force is released from the third safety lock 250 the lock pivots back into the first position, which corresponds to the locked position. This is true even when the door is pivoted into the open position. Accordingly, the safety lock is configured so displace into the second or unlocked position as the door is pivoted from the open position to the closed position. More specifically, referring to FIG. 21, The latch 258 comprises an angled outer edge 259. Additionally, the door may comprise an angled surface 226 configured to cooperate with the angled outer surface 259 of the safety lock 250. In this way, as the door pivots toward the closed position, the angled surface 226 on the door engages the angled surface 259 on the safety lock 250, thereby displacing the safety lock toward the open position. After the door displaces the safety lock into the unlatched position, the latch extends through the aperture 224 in the door. The biasing element then displaces the latch back into the locked position as shown in FIG. 18.

As described above, the safety door 220 may include one or more safety locks to prevent the door from opening. Although a single safety may be incorporated, in the present embodiment, multiple safety locks are included to impede accidental actuation. Further still, the safety locks may be configured so that simultaneous actuation of the safety locks is required to release the safety door. Additionally, the safety locks may be configured and positioned to impede intentional by inappropriate opening of the safety door. For instance, by incorporating three separate safety locks spaced apart from one another, it is difficult or impossible for an operator to press the actuators 232, 242, 252 by hand to open the safety door 220. Additionally, in the present instance the actuation forces used to open the safety locks are transverse one another. In other words, the actuation forces are not parallel. For example, referring to FIG. 15, the actuation force applied to the first and second safety latches 230, 240 are parallel forces directed inwardly toward the storage location. Conversely, the actuation force applied to the third safety lock 250 is downward. In this way, the safety locks require simultaneous transverse actuation forces applied at separate points that are spaced apart from one another.

Although the system incorporates multiple safety locks configured to keep the safety doors closed, the safety locks are configured and positioned so that the safety door can be easily opened by operator. Specifically, the safety locks are configured and positioned so that the act of inserting a storage bin into the storage location unlocks the door. For example, referring to FIGS. 14-15, the upper safety locks 230, 240 are positioned so that the upper edge or lip 42 of the storage bin simultaneously engages the actuators 232, 242. In particular, the actuators 232, 242 are spaced from the shelf 210 by a height that is similar to the height of the storage bin. Additionally, the third safety latch 250 is positioned so that the bottom edge 45 of the bin 40 engages the actuator 252, pressing the actuator downwardly. In this way, the act of displacing the bin 40 toward the safety door causes the bin to simultaneously actuate all three actuators 232, 242, 252 of the three safety locks 230, 240, 250. Additionally, after actuating the actuators to unlock the door, displacement of the bin toward the door 220 displaces the door into the open position as the bin is loaded into the storage location. Once the bin is loaded into the storage location, the bin rests in the storage location with the safety door in a generally horizontal orientation below the bin as shown in FIG. 13. When the bin is removed from the storage location a biasing element biases the door toward the closed position to relock the door in the closed position.

In the foregoing description, multiple elements have been described for limiting potential injury that could occur if an operator reaches into the aisle where delivery mechanism move around to deliver items to storage locations. In the embodiments described above, a barrier, such as a door closes the opening between the aisle and the sort location. The barrier may be selectively displaceable to allow delivery of items into the storage locations.

Although the safety mechanisms described above incorporate physical barriers, it should be understood that the system may be configured to use virtual barriers to prevent injury to operators and/or damage to the system. For example, each storage location may include a sensor for detecting the presence of an item. The sensor may be a beam sensor having an emitter and a receiver that detects whether an item passes between the emitter and receiver. Similarly, the sensor may be a light curtain or other sensor that detects the presence of an item. The system may control operation of the elements in the aisle in response to the signals from the sensors. For example, in an exemplary embodiment, a first sensor may be positioned at the back edge of a storage location, adjacent the aisle. A second sensor may detect the presence of a bin in the storage location. If the first sensor detects the presence of an item and the second sensor does not detect the presence of a bin, then the system may shut down operation of the elements in the aisle. For instance, if the system includes a number of delivery vehicles operating in the aisle, the system may control the operation of the vehicles to automatically stop the vehicles in response to the signals received from the first and second sensors. Similarly, the system may include a single sensor located at the back edge of the storage location and the system may control operation of the vehicles in response to the signals received from the sensor and the known location of the vehicles. In particular, the sensor may be operable to detect when an item extends through the storage location into the aisle. If a vehicle is located at the storage location delivering an item, then the sensor may detect the item being delivered. On the other hand, if a vehicle is not at the storage location and the sensor detects an item, then the sensed item may be an operator extending into the aisle or an item that did not load properly into the storage location and is projecting into the aisle. In either instance, the system may control the operation of the vehicles by immediately stopping all vehicles until the item is removed from the storage location (which could include an item delivered to the storage location or a part of the operator if the operator reaches into the storage location). In this way, the system may control the operation of the delivery mechanisms in response to signals from a sensor combined with known information regarding the position and/or operation of the delivery mechanisms. Although these examples describe two possible embodiments for using a virtual safety rather than a physical barrier, it should be understood that a variety of configurations can be used to control the operation of the system to prevent injury if the operator extends through a storage location and into the aisle while the system is in operation.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

What is claimed is:

1. A material handling system, comprising:
   a plurality of sort locations for receiving items;
   an aisle formed between the plurality of sort locations;
   a delivery mechanism operable within the aisle to deliver items to the sort locations;
   a displaceable door at one of the sort locations wherein the door is operable between an open position and a closed position wherein in the closed position the door impedes access into the aisle through the one sort location;
   a biasing element biasing the door toward the closed position,
   wherein the one sort location comprises a forward opening and a rearward opening wherein the rearward opening le adjacent the aisle and the forward opening is remote from the aisle wherein the delivery mechanism is configured to displace items from the aisle through the rearward opening of the one sort location;
   wherein the displaceable door is configured to impede access through the forward opening when the door is in the closed position.
   wherein the one sort location is configured to receive a container and wherein the biasing element is configured so that when the container is in the one sort location the door remains in the open position by the weight of the container overcoming the bias of the biasing element.

2. The material handling system of claim 1 wherein the biasing element is configured to automatically displace the door into the closed position in response to the container being removed from the one sort location.

3. The material handling system of claim 1 comprising a safety lock releasably retaining the door in the closed position.

4. The material handling system of claim 3 wherein the safety lock comprises a plurality of locks that are spaced apart, wherein each lock is operable to retain the door in the closed position.

5. The material handling system of claim 4 wherein the plurality of locks are configured so that simultaneous actuation of each of the plurality of locks is required to unlock the door so that the door can be displaced into the open position.

6. The material handling system of claim 4 wherein the plurality of locks are positioned and configured so that the actuation force for actuating a first of the locks is transverse the actuation force for actuating a second of the locks.

7. The material handling system of claim 1 wherein the delivery mechanism comprises a delivery vehicle that is vertically displaceable along a track.

8. The material handling system of claim 1 wherein the sort locations comprise a first array of sort locations located on a first side of the aisle and a second array of sort locations located on a second side of the aisle.

9. The material handling system of claim 8 wherein the first and second arrays oppose one another.

10. The material handling system of claim 8 wherein the delivery mechanism is operable to deliver items to sort locations in the first and second arrays.

11. A method for sorting items into a plurality of sort locations, comprising the steps of:
    driving a delivery mechanism within an aisle that is adjacent a plurality of sort locations to one of the sort locations wherein the one sort location includes a forward opening and a rearward opening and a displaceable door operable between an open position and a closed position, wherein in the closed position the door impedes access into the aisle through the forward opening of the one sort location; placing a bin on the door to displace the door into the open position; and transferring an item from the delivery vehicle into the bin while the door is in the open position.

12. The method of claim 11 comprising the step of biasing the door to the closed position.

13. The method of claim 11 comprising the step of releasably latching the door in the closed position to lock the door in the closed position.

14. The method of claim 13 comprising the step of releasing the latches to unlock the door, wherein the step of releasing comprises the step of simultaneously actuating a plurality of latches.

15. The method of claim 14 wherein the step of releasing the latches comprises providing a first actuation force for actuating a first latch and providing a second actuation force for actuating a second latch, wherein the first actuation force is transverse the second actuation force.

16. The method of any of claims 14 wherein the step of releasing the latches comprises displacing the bin into engagement with release elements connected with the latches.

17. A method for sorting items into a plurality of sort locations, comprising the steps of:

driving a delivery mechanism within an aisle that is adjacent a plurality of sort locations wherein a plurality of bins are located at the plurality of sort locations;

releasably latching a door in a closed position to lock the door in the closed position displacing one of the bins into engagement with an actuator to displace the door from the closed position from a closed position to an opened position, wherein the one bin is at one of the sort locations;

wherein the step of driving comprises driving the delivery mechanism to the one sort location and wherein in the closed position the door impedes access into the aisle through the one sort location; and transferring an item from the delivery mechanism into the bin while the door is in the open position.

18. The method of claim 17 comprising the step of biasing the door to the closed position.

19. The method of claim 17 wherein the step of displacing a bin comprises releasing a latch to unlock the door.

20. The method of claim 19 wherein the step of displacing a bin comprises simultaneously releasing a plurality of latches.

* * * * *